(12) United States Patent
Schmidt

(10) Patent No.: US 9,709,963 B2
(45) Date of Patent: Jul. 18, 2017

(54) CONTROL DEVICE FOR CONTROLLING SAFETY-CRITICAL PROCESSES IN AN AUTOMATED PLANT AND METHOD FOR PARAMETERIZING THE CONTROL DEVICE

(71) Applicant: Phoenix Contact GmbH & Co. KG, Blomberg (DE)

(72) Inventor: Joachim Schmidt, Bad Pyrmont (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 507 days.

(21) Appl. No.: 14/379,430

(22) PCT Filed: Mar. 14, 2013

(86) PCT No.: PCT/EP2013/055225
§ 371 (c)(1),
(2) Date: Aug. 18, 2014

(87) PCT Pub. No.: WO2013/135807
PCT Pub. Date: Sep. 19, 2013

(65) Prior Publication Data
US 2015/0045915 A1 Feb. 12, 2015

(30) Foreign Application Priority Data
Mar. 15, 2012 (DE) .......................... 10 2012 102 187

(51) Int. Cl.
*G05B 9/02* (2006.01)
*G05B 19/048* (2006.01)
*H04L 29/08* (2006.01)

(52) U.S. Cl.
CPC ............. *G05B 9/02* (2013.01); *G05B 19/048* (2013.01); *H04L 67/10* (2013.01)

(58) Field of Classification Search
CPC .......... G05B 9/02; G05B 19/048; H04L 67/10
(Continued)

(56) References Cited

U.S. PATENT DOCUMENTS

| 5,980,078 A | 11/1999 | Krivoshein et al. |
| 7,330,768 B2 * | 2/2008 | Scott .................. G05B 23/0213 700/21 |

(Continued)

FOREIGN PATENT DOCUMENTS

| CN | 101807074 A | 8/2010 |
| CN | 102025610 A | 4/2011 |

(Continued)

OTHER PUBLICATIONS

Kastner, Wolfgang, et al. "Communication systems for building automation and control." Proceedings of the IEEE 93.6 (2005): pp. 1178-1203.*

(Continued)

*Primary Examiner* — Satish Rampuria
(74) *Attorney, Agent, or Firm* — Kaplan Breyer Schwarz, LLP

(57) ABSTRACT

Safety-related functions in automation systems for controlling industrial production processes are achieved by providing a simple and safe parameterization of the safety-related apparatuses of such an automation plant. After a start signal sent by the communication master is received, all further activities for parameterization are controlled by a logic module.

12 Claims, 4 Drawing Sheets

(58) Field of Classification Search
USPC .................. 700/2, 4, 8, 21, 79–88, 108–111
See application file for complete search history.

(56) References Cited

U.S. PATENT DOCUMENTS

| | | | | |
|---|---|---|---|---|
| 2003/0033519 | A1* | 2/2003 | Buckman | H04L 67/2823 713/153 |
| 2004/0158713 | A1* | 8/2004 | Aneweer | G05B 23/027 713/166 |
| 2010/0217894 | A1* | 8/2010 | Papenfort | G05B 19/0421 710/15 |
| 2010/0250813 | A1* | 9/2010 | Barthel | G05B 19/0421 710/301 |
| 2011/0071654 | A1* | 3/2011 | Schmidt | G05B 19/0428 700/79 |
| 2012/0022671 | A1* | 1/2012 | Sachs | G05B 9/02 700/79 |

FOREIGN PATENT DOCUMENTS

| | | |
|---|---|---|
| DE | 102007050708 A1 | 6/2009 |
| DE | 102009028655 A1 | 2/2011 |
| DE | 102009041402 A1 | 3/2011 |
| DE | 102009042354 A1 | 3/2011 |
| DE | 102009042368 A1 | 3/2011 |
| EP | 1353246 A2 | 10/2003 |
| EP | 1746767 B1 | 8/2009 |
| EP | 1731976 B1 | 6/2011 |
| JP | 2001512599 A | 8/2001 |
| JP | 2005310138 A | 11/2005 |

OTHER PUBLICATIONS

Dzung, Dacfey, et al. "Security for industrial communication systems." Proceedings of the IEEE 93.6 (2005): pp. 1152-1177.*

Christofides, Panagiotis D., et al. "Smart plant operations: Vision, progress and challenges." AIChE Journal 53.11 (2007): pp. 2734-2741.*

Leveson, Nancy G. "Software safety: Why, what, and how." ACM Computing Surveys (CSUR) 18.2 (1986): pp. 125-163.*

Yang, S. H., et al. "Automatic safety analysis of computer-controlled plants." Computers & Chemical Engineering 25.4 (2001): pp. 913-922.*

Cárdenas, Alvaro A., et al. "Attacks against process control systems: risk assessment, detection, and response." Proceedings of the 6th ACM symposium on information, computer and communications security. ACM, 2011. pp. 355-366.*

"Office Action", dated Jan. 28, 2016, issued in counterpart Chinese Patent Application No. 201380013775.6.

Constantin Gunther, Patentanwalt, "Opposition against the German Patent DE 10 2012 102 187 B3 owned by Phoenix Contact GmbH & Co. KG", "Opposition Writ", Oct. 10, 2013, Publisher: Opponent: WAGO Kontakttechnik GmbH & Co. KG, Published in: DE.

"Related German Patent Application No. DE 10 2012 102 187.2", "Office Action", Oct. 26, 2012, Publisher: German Patent and Trademark Office, Published in: DE.

"Related International Patent Application No. PCT/EP2013/055225", "International Search Report and Written Opinion", Jul. 30, 2013, Publisher: PCT / EPO as International Seaching Authority, Published in: EP.

"Profile Guidelines, Part 4, iPar-Server", "Technical Specification for PROFIBUS and PROFINET I/O", Jul. 2011, Page (s) Order No. 3.532, vol. 1.0.1, Publisher: Profibus Nutzerorganisation e.V., Published in: DE.

"Universal-Parameter-Server (FB24)", "SIMATIC 57", Nov. 2010, pp. 1-14, vol. 1.0b, Publisher: Siemens, Published in: DE.

"Siemens Industry Online Support—Automation Service—Automation Support ", "http://support.automation.siemens.com/WW/llisapi.dll?func=ll&objid=45841087&no", Oct. 26, 2010, vol. 1, No. 1, Publisher: Siemens, Published in: DE.

"PROFIsafe—Profile for Safety Technology on PROFIBUS DP and PROFINET I/O", "Specification for PROFIBUS and PROFINET", Mar. 2007, Page(s) Order No. 3.192b, vol. 2.4, Publisher: PROFIBUS Nutzerorganisation e.V., Published in: DE.

* cited by examiner

CONTROL DEVICE FOR CONTROLLING SAFETY-CRITICAL PROCESSES IN AN AUTOMATED PLANT AND METHOD FOR PARAMETERIZING THE CONTROL DEVICE

FIELD OF THE INVENTION

The invention relates generally to the technical field of automation systems for controlling industrial production processes. In particular, the invention relates to safety-related functions in such automation systems and to the parameterization of the safety-related functions.

BACKGROUND OF THE INVENTION

A method and a device for safety-related communication in the communications network of an automation plant are disclosed in DE 10 2009 042 354 A1. A fundamental idea here is to divide the safety function of a plant into small, manageable, locally imitable and easily verifiable module groups. These groups form more or less self-sufficient islands within the communications network. In particular, a non-safe communication master and a plurality of decentralized modules are provided as network subscribers. The decentralized modules are accordingly networked with the communication master by means of a communications network, wherein the communication between the decentralized modules in the communications network is realized by means of telegrams. At the same time, several of the modules are safety modules, between which safety-related data are transmitted, and form a logical group of modules for executing a safety-related function. For the communication of the safety modules within a logical group, the communication master holds a routing table in which logical connections between the decentralized safety modules are stored according to the safety-related function. The communication master then carries out an automatic routing of the data from the transmitting safety module to the receiving safety module, controlled on the basis of the routing table, so that a communication between the safety modules belonging to a logical group takes place in each case via two point-to-point connections, namely from the transmitting safety module to the communication master and further from the communication master to the receiving safety module. The communications network has a device for requesting information for creating the routing table from the safety modules and for creating the routing table based on this information.

Furthermore, DE 10 2009 042 368 A1 describes a control system for controlling safety-critical processes with a non-safe communication master and a non-safe communications network. At least some of the network subscribers include safety data input objects (SDI objects), such as, for example, safety-related sensors, and/or safety data output objects (SDO objects), such as safety-related actuators, for example. Network subscribers, which are designed as decentralized safe network subscribers and, unlike the SDI or SDO objects, in each case have their own decentralized safety controller, are connected to the network. For this purpose, these network subscribers have an unambiguous, adjustable safety address.

The safe network subscribers are grouped with SDI and/or SDO objects to form safety islands. Controlled by the decentralized safety controller, communication internal to the island between safe network subscriber and associated SDI and SDO objects as well as inter-island safety-related communication between the safe network subscribers is possible with this configuration.

SUMMARY OF THE INVENTION

The invention is now based on the object of providing a simple and safe parameterization of the safety-related apparatuses of such an automation plant and a control system for controlling safety-critical processes. In particular, a method as simple as possible, which is to enable the parameterization of a modular, decentralized and safe automation system with the help of means which, if possible, every non-safe controller and every network provide, is to be enabled.

The so-called iPar server of the Profisafe specification is known for parameterizing network subscribers. Here, it is provided that the safe network subscribers are parameterized by means of a computer, such as a PC for example, and this parameterization is then retentively stored and additionally transmitted to the iPar server. The iPar server itself is not safe by design and can be integrated, for example, in a non-safe controller in the network. After power-up, the safe network subscriber starts up with its saved parameterization. If the safe network subscriber is defective, then a replacement of the subscriber is required. The new safe subscriber does not now have the required parameterization. The subscriber reports this to the iPar server which thereupon transmits the required safe parameters. The safe parameters must have their own safeguard against corruption for this purpose.

In the SafetyBridge system, which is also referred to as an INLINE Safety System and is described in the above-mentioned publications DE 10 2009 042 354 A1 and DE 10 2009 042 368 A1, the invention can be used to parameterize a safe logic module and the associated safe network subscribers. It enables integration with widely differing non-safe controllers and networks.

The SafetyBridge system is based on the fact that, with the help of connections via any network and copy commands, a non-safe controller, or a non-safe communication master, enables the exchange of safe telegrams with safe I/O data between the network subscribers with safe inputs and/or outputs and the logic module which processes the safe I/O data and itself can also have safe inputs and/or outputs. A safe point-to-point connection, on which safe telegrams can be transmitted in both directions, therefore exists between the logic module and each safe network subscriber associated with it. The invention is also particularly suitable for parameterizing a logic module of this SafetyBridge system.

According to the invention, a control device with a communications network for controlling safety-critical processes in an automated plant and a parameterization method which can be carried out thereby are provided, wherein the communications network has a, in particular, non-safe communications master for controlling the data flow on the communications network and a plurality of network subscribers, wherein at least one subset of the network subscribers are designed as safe network subscribers, and at least one safe logic module as further network subscriber for controlling a safety-relevant application by means of a group of safety-related network subscribers, wherein the logic module and the communication master are set up for carrying out the following steps in order to parameterize the logic module:

in response to the receipt of a start command transmitted via the communications network, the logic module transmits a read request to the communication master via the communications network, in response to the receipt of the read request, the communication master transmits parameterization data to the logic module.

Accordingly, a special feature of the invention is that, after the receipt of a start signal transmitted by the communication master, all further activities are controlled by the receiver, that is to say the logic module.

BRIEF DESCRIPTION OF THE DRAWINGS

The invention is described in more detail below on the basis of exemplary embodiments and with reference to the attached drawings. Here, the same references in the drawings refer to the same or corresponding elements. In the drawings.

DETAILED DESCRIPTION

Figure 1:
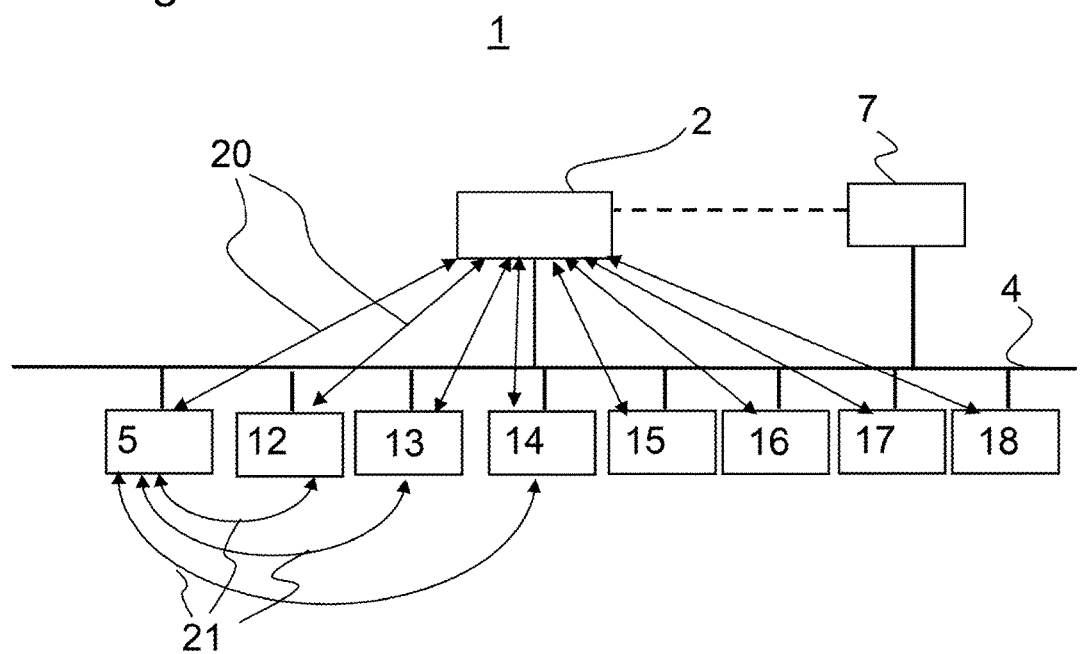
FIG. 1 shows a schematic circuit diagram of a control device.

FIG. 1 shows a schematic circuit diagram of an exemplary embodiment of a control device 1 according to the invention with a communications network 4 which, as well as controlling automatic manufacturing and monitoring processes, is also designed for controlling safety-critical processes in an automatic plant. A number of network subscribers 5, 12-18 are connected to the communication master 2 via the communications network 4. In a development of the invention, communication of the network subscribers 5, 12-18 takes place via point-to-point connections to the communication master 2. Here, by appropriate routing of the communication telegrams, the communication master 2 establishes logical connections between the network subscribers 5, 12-18. Some of the logical connections 21 are shown by way of example in FIG. 1. The communication master 2 therefore serves to control the data flow on the communications network 4.

Although the control device 1 is used for controlling safety-critical processes, such as for example an emergency stop function of a machine when a light barrier is triggered, the communication master 2 itself does not have to be safe by design.

In the example shown in FIG. 1, a subset of the network subscribers 12, 13, 14, 15, 16, 17, 18, namely the network subscribers 12, 13, 14, are designed as safe network subscribers 12, 13, 14. The safe logic module 5 likewise constitutes a safe network subscriber. In operation, the logic module 5 communicates via the point-to-point connections 20 and therefore via the logical connections 21 with the safe network subscribers 12, 13, 14 in order to control a safety-critical process. Here, the safe network subscribers 12, 13, 14 can, in particular, be input and/or output modules such as sensors and actuators for the safety-critical process.

The SafetyBridge system, on which the exemplary embodiment shown in FIG. 1 is preferably based, is based on the fact that, with the help of connections via any communications network 4 and with copy commands, a non-safe controller, that is to say the non-safe communication master 2, enables the exchange of safe telegrams with safe I/O data between the network subscribers with safe inputs and/or outputs and the logic module 5 which processes the safe I/O data and itself can also have safe inputs and/or outputs. A safe point-to-point connection in the form of the logical connection 21, on which safe telegrams can be transmitted in both directions, therefore exists between the logic module 5 and each safe network subscriber associated therewith.

The network subscribers 12, 13, 14 are linked to the logic module to form a group of safety-related network subscribers for controlling a safety-relevant application.

In order now to parameterize the logic module 5 and therefore also the safety-relevant application, in response to a start command received via the communications network 4, the logic module 5 transmits a read request to the communication master 2.

In particular here, it is of advantage when the communication master 2 is set up to transmit the start command to the logic module 5 via the communications network 4 to start the parameterization process. The parameterization process can therefore be easily started for one or more such logic modules when the system is powered up.

Furthermore, in response to the receipt of the read request, the communication master 2 is set up to transmit parameterization data to the logic module 5.

In a development of the invention, in order to transmit the parameter data, additional non-safe input and output bytes are now implemented on the logic module 5, by means of which the parameterization data of the non-safe controller or the communication master 2 are transmitted to the logic module 5 with the help of a simple parameterization protocol. In addition, the communication master 2 can in particular be set up to transmit the parameterization data in a logical channel provided for the purpose which is represented by a predetermined data range of the telegrams transmitted via the communications network 4. In the example shown in FIG. 2, a parameter channel 40 is provided as the logical channel.

In particular, the parameterization data can contain the types of the network subscribers 12, 13, 14, which are connected by means of the respective point-to-point connections 20 or in accordance with the logical connections 21 to the logic module 5, and the links of the network subscribers 12, 13, 14 between one another, that is to say, therefore, the manner in which the safety-critical process is to be controlled.

According to a development of the invention, the parameterization data are generated with the help of safe parameterizing/programming software which runs on a computer, for example. Preferably, the parameter data are at least partially structured from device description files of the logic module and the safe I/O network subscribers. In the example shown in FIG. 1, a computer 7, such as a PC for example, is connected to the communications network 4 for this purpose. The safe parameterizing/programming software is processed on this computer 7 and structures the parameter data for the safe I/O network subscribers, that is to say, in the exemplary embodiment shown in FIG. 1, for the network subscribers 12, 13, 14. Alternatively or in addition, the computer 7 can also be connected directly to the communication master 2 as symbolized dashed in conjunction with FIG. 1.

According to an advantageous embodiment of the invention, the parameterization data can be divided into segments and are stored as a data module in the non-safe controller or in the communication master 2. The communication master 2 informs the logic module 5 that a data module with parameterization data is available and that the logic module 5 is to be started with these data. According to the invention, all further activities for the parameterization are now controlled by the data receiver, that is to say, here, the logic module 5. The logic module 5 knows the structure of the parameterization data and transmits a data request in the form ParameterReadRequest (segment, offset, length). This request is transmitted until the non-safe controller responds with the requested data in the form ParameterReadResponse (segment, offset, length, data, data). In general, without being restricted to the exemplary embodiments, according to this development of the invention, the logic module 5 is therefore set up to detect how much parameterization data is to be requested and to transmit read requests to the communication master 2 until all parameterization data have been received. Furthermore, for this purpose, it is of advantage when the communication master 2 is set up to divide up the parameterization data and to transmit them successively in a plurality of telegrams. In this way, there are no restrictions to the scope of the parameterization data. The respective recipient of the data (safe logic module or also safe I/O network subscriber as explained below) therefore transmits a read request until the corresponding read response is received thereby. This enables transmission to take place over any networks and combinations of networks.

When the logic module 5 has read out all the required parameterization data from the non-safe controller, it starts processing the parameterized links. The parameterization data which the logic module 5 has read out of the non-safe controller or the communication master 2 also contain the parameters for the associated safe I/O network subscribers, that is to say, in the example shown in FIG. 1, the safe network subscribers 12, 13, 14 associated with the logic module 5.

The logic module informs the associated safe I/O network subscribers 12, 13, 14 of its parameterized state via parameter channels. Thereupon, the safe I/O network subscribers, that is to say the network subscribers 12, 13, 14, for their part read out their parameters from the logic module 5 via the parameter channels with the help of the parameterization protocol.

Each safe logic module 5 and each safe I/O network subscriber changes into the parameterized state and starts processing after it has read all the required parameterization data.

Figure 2:
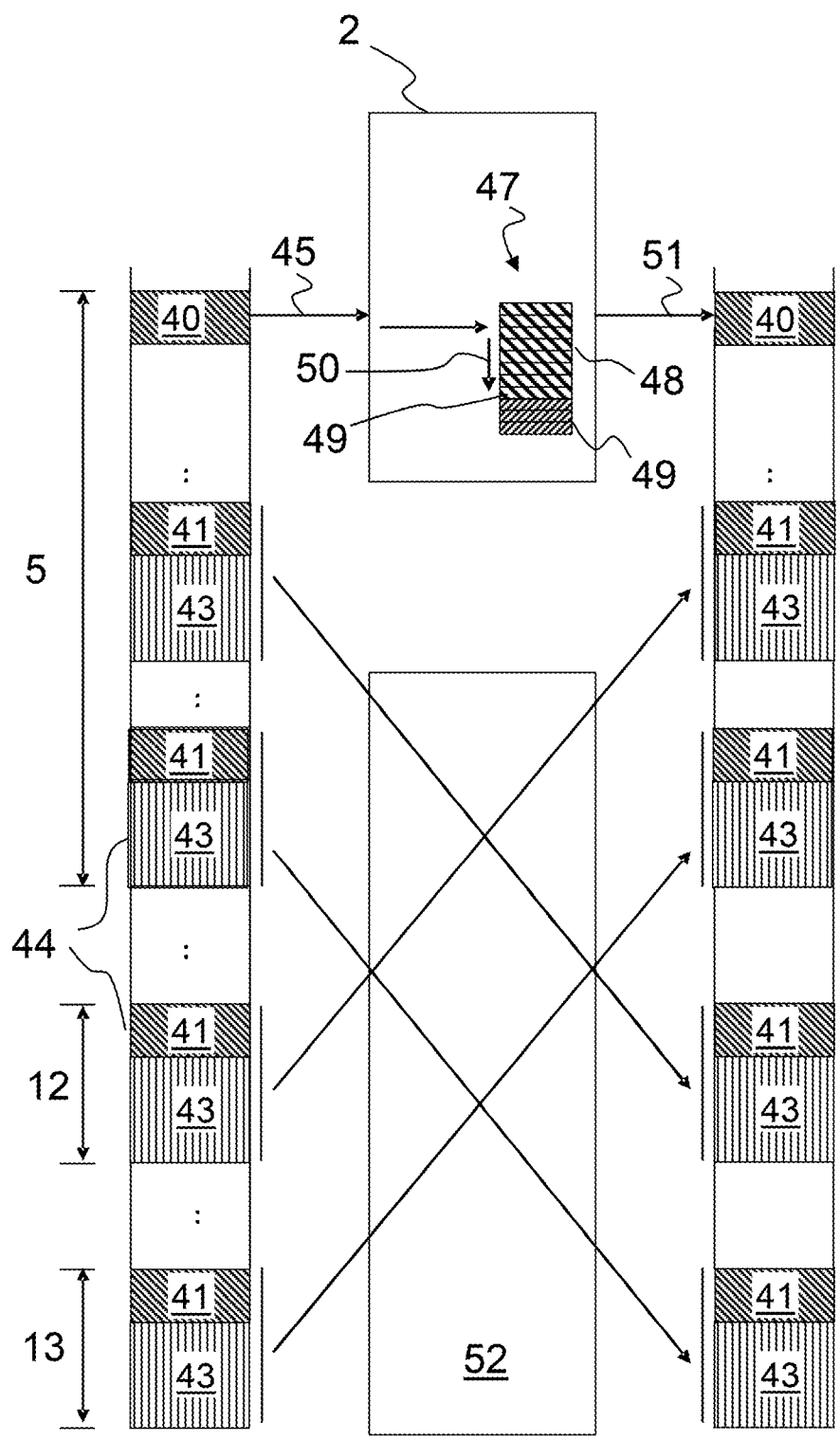
FIG. 2 shows an I/O image of the communication master.

In order to transmit the parameter data to the I/O modules, the I/O ranges for the safe telegrams are extended by a parameter channel 41, via which device and communications parameters are transmitted by the logic modules to the associated safe I/O network subscribers. Accordingly, as shown in FIG. 2, a safe telegram 44 contains a data range 43 for safe messages and a parameter channel 41. An exemplary embodiment for the parameterization of the logic module 5 is described below on the basis of the flow diagram shown in FIG. 3. The time axis of this flow diagram runs from top to bottom.

The parameterization process begins when the system is powered on. The communication master 2 detects that a parameterization for a logic module 5, for example in the form of a data module, is available and transmits a start command ("Start Command (Parameter Ready)") to the logic module 5 (step 31). According to a development which is not restricted to the exemplary embodiment, triggered by a system power-on or more generally an initialization of the logic module and/or in response to a start command received from the communication master 2, the logic module 5 is furthermore set up to initially transmit a telegram to the communication master 2 with the state of the logic module as a diagnostic message (step 32, "Diagnostic Message (Logic Module STOP)"). The initialization can also include a connection of the logic module to the communications network 4.

Figure 3:
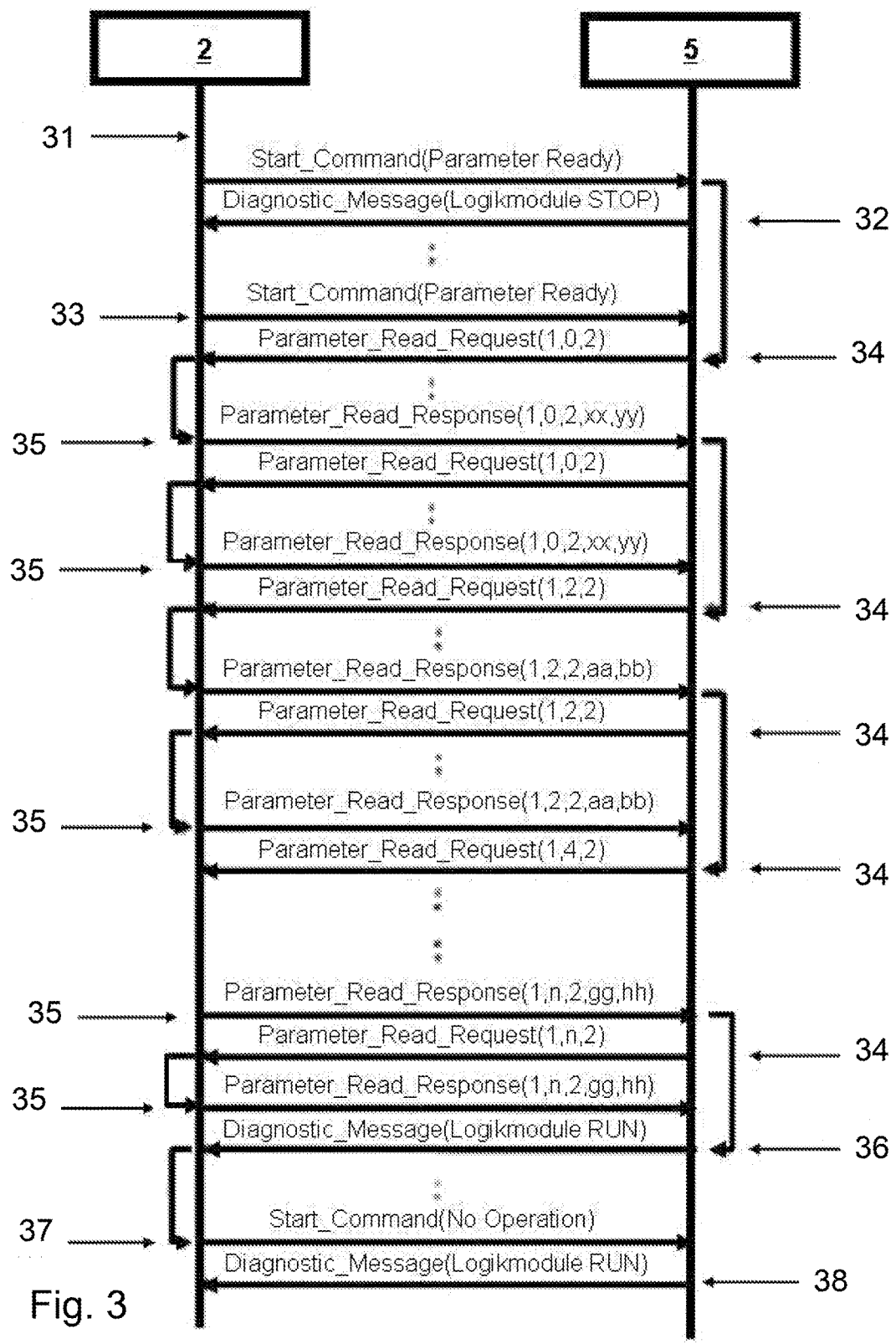
FIG. 3 shows a flow diagram for the parameterization of a logic module.

In the example shown in FIG. 3, after the receipt of the diagnostic message from the communication master 2, a start command is transmitted to the logic module 5 (step 33). In general, without restriction to the special exemplary embodiment shown, the communication master 2 can be set up to transmit a start command to a logic module 5 until the communication master 2 receives a read request.

In response to "Parameter Ready" or, in general, to the start command, the logic module 5 starts to read out the parameters (step 34), e.g. Segment: 1, Offset: 0, Length: 2 (command "Parameter Read Request (1. 0. 2)"). In response thereto, the communication master 2 transmits the requested data (step 35). These steps 34, 35 are repeated until the last bytes of the parameterization data have been transmitted.

In general, in a development of the invention, without being restricted to the special exemplary embodiment shown in FIG. 3, the logic module 5 is therefore set up to transmit with the read request a request of a particular part of the parameterization data. The communication master 2 is then set up accordingly to transmit the requested part of the parameterization data on this request. Accordingly, in order to implement this protocol according to the invention, the non-safe controller, or the communication master 2, must only have the capability of addressing the individual parameter bytes in the form Parameter [Address (Segment+Offset), Length] and of copying them into the output range. This is usually the case, and integration into different controllers is therefore possible. The width of the parameter protocol can also be matched to the width of the consistency ranges of the non-safe controller. The processing of the protocol is shown schematically in FIG. 2. The parameter set 47 is subdivided into segments 48, 49 and stored in the communication master 2. For clarification, the different segments 48, 49 are shown shaded differently. By way of example, in FIG. 2, the parameter set 47 is made up of only two segments 48, 49. Naturally, however, more segments can also be provided.

The read requests 45 received on the input side by the communication master 2 are processed by the communication master 2 to the effect that, from a particular segment 48 of the parameter set 47 stored in the communication master 2 specified in the read request 45, a particular number of bytes 49 is read out, the position of which in the segment 48 is determined by an offset 50 which is likewise specified in the read request 45. The bytes 50 are then transmitted on the output side to the logic module 5 via the parameter channel 40 in the above-mentioned form of a ParameterReadResponse message 51.

According to a further development of the invention, when all the parameterization data have been transmitted, the logic module 5 carries out a consistency check of the transmitted data and thereupon transmits a diagnostic message to the communication master (2), step 36. In the event of error-free transmission, the logic module 5 can start and transmit an appropriate message (here: "Diagnostic Message (Logic Module RUN)") to the communication master 2 as a diagnostic message. In the event of an error, an appropriate error message can be transmitted as a diagnostic message. A possible error, for example, is a lack of consistency in the transmitted data, which can be caused, for example, by a transmission error. A simple consistency check is a CRC check of the received parameterization data by the safe logic module 5.

Start commands (step 37) and diagnostic messages (step 38), which signal that currently no new parameterization data are to be called up by the logic module 5 and/or that the logic module 5 is in operation, can then also be transmitted during operation of the control device 1 in the provided data ranges of the transmitted telegrams.

Furthermore, the invention can also be extended to the effect that differentiated start commands are used.

The usual start command signals to the logic module 5 that parameters are present and accordingly the above-mentioned processing is to be started in order to parameterize the logic module 5. As explained with regard to the exemplary embodiment of FIG. 3, a reading-out of the parameters of the complete project from the non-safe controller or the communication master 2 is thereupon undertaken controlled by the logic module 5. This is followed by a safe consistency check (CRC, plausibility). If the parameterization data are free from errors, the processing starts. Otherwise, an error message is generated by the logic module 5 as a diagnostic message.

A further possibility is that the communication master is set up to generate a start command which signals that a parameter identifier is present. Here, in a development of the invention, the logic module can be set up to read out the parameter identifier (header or CRC) from the communication master 2 and to safely compare the parameter identifier with parameters retentively stored in the logic module. In the case of a positive comparison of the parameter identifier with the stored data, the logic module starts processing the parameterization data; otherwise an error message is again preferably generated and transmitted to the communication master 2.

Yet another possibility is a start command which signals that new parameters, in particular a complete project, are to be retentively stored in the logic module 5.

As a confirmation and for safety checking, the parameter identifier of the old previously retentively stored parameter set can be stored on the non-safe controller. The old parameter identifier (header or CRC) is then first read out of the non-safe controller by the logic module 5 and the logic module undertakes a safe comparison with the retentively stored parameters. If the data are consistent, the logic module 5 erases its remanent memory; otherwise the logic module 5 transmits an error message. If the data are consistent, the new parameters are read out of the non-safe controller by means of one or more read commands of the logic module. The new parameterization data read out are again checked for consistency, preferably with CRC and a plausibility check. If the parameterization data are detected by the logic module 5 to be free from errors, these are or remain retentively stored. Otherwise, an error message is again transmitted.

Yet another possible start command which can be output by the communication master 2 is a command to stop the processing. Here, in response to the receipt of this start command, the logic module can be set up to stop the processing and to either restart it or to request new parameterization data.

In the exemplary embodiment of the invention previously described, the communication master 2 constitutes the data source for the parameterization data of the logic module 5. After receipt of the parameterization data, it is now also possible for the logic module 5 for its part to act as data source. Here, according to a first embodiment of this development of the invention, the logic module 5 provides the associated safe network subscribers 12, 13, 14 with the parameterization data intended for them.

As soon as the safe logic module has read all parameters out of the non-safe controller, as a start command, it reports via the parameter channels to the associated safe network subscribers 12, 13, 14 that parameters are ready for them. Thereupon these read out their parameters from the logic module 5 in the manner described above. Accordingly, in response to the receipt of a start command transmitted by the logic module 5 via the communications network 4, the safe network subscribers 12, 13, 14 which are associated with the logic module 5 for the control of a safety-related application, or at least one of these associated safe network subscribers 12, 13, 14, are set up to transmit a read request to the logic module 5 via the communications network 4. For its part, in response to the receipt of the read request, the logic module 5 is set up to transmit parameterization data to the particular safe network subscriber 12, 13, 14 from which the read request was received.

By way of example, the start command of the safe logic module 5 can therefore contain the message to the network subscriber that parameters are present and the processing is to be started. According to an embodiment of the invention, a reading-out of the parameters (communications and device parameters) of the safe logic module 5 and a safe check for consistency (CRC, plausibility) are carried out as actions of the associated safe I/O network subscribers 12, 13, 14 initiated thereby. If the check is free from errors, a change occurs in the parameterized state, and processing starts with the transmission of safe I/O data. Otherwise, an error message is produced.

A start command can also contain the instruction that the processing is to be stopped. In this case, in response to the receipt of such a start command, the safe network subscribers 12, 13, 14 can be set up to change to the non-parameterized state and, by means of a read request, to request a transmission of safe replacement values from the logic module 5.

The invention also offers the advantage that the method for parameterization can be extended hierarchically. Further logic modules can be assigned to a logic module 5 as subordinate I/O subscribers. The subordinate logic modules can then read out their parameters (including the linking instructions) from the superimposed logic module 5. In this way, more safe I/O points and processing capacity are available to the user. From the user's point of view, there is only one system, which is represented by the superimposed logic module.

In particular, the reading-out from the superimposed logic module 5 can take place in the same way as the reading-out described above of the parameterization data from the communication master 2 by the logic module 5.

Therefore, according to a development of the invention, as well as the logic module 5, at least one further logic module is connected to the communications network 4, wherein, in the manner according to the invention, the first logic module is parameterized by a start command of the communication master, at least one read request of the logic module, and a transmission of the parameterization data from the communication master 2 to the logic module 5, and wherein the further logic module is parameterized in a corresponding manner in that, after receipt of the parameterization data, the logic module transmits a start command to the further logic module, in response to the receipt of the start command the further logic module transmits a read request to the first logic module, and in response to the receipt of the read request the first logic module transmits the parameterization data to the further logic module. In order to carry out this method hierarchically, in addition, the communication master 2 also transmits the parameterization data for the further logic module to the first logic module 5.

Figure 4:
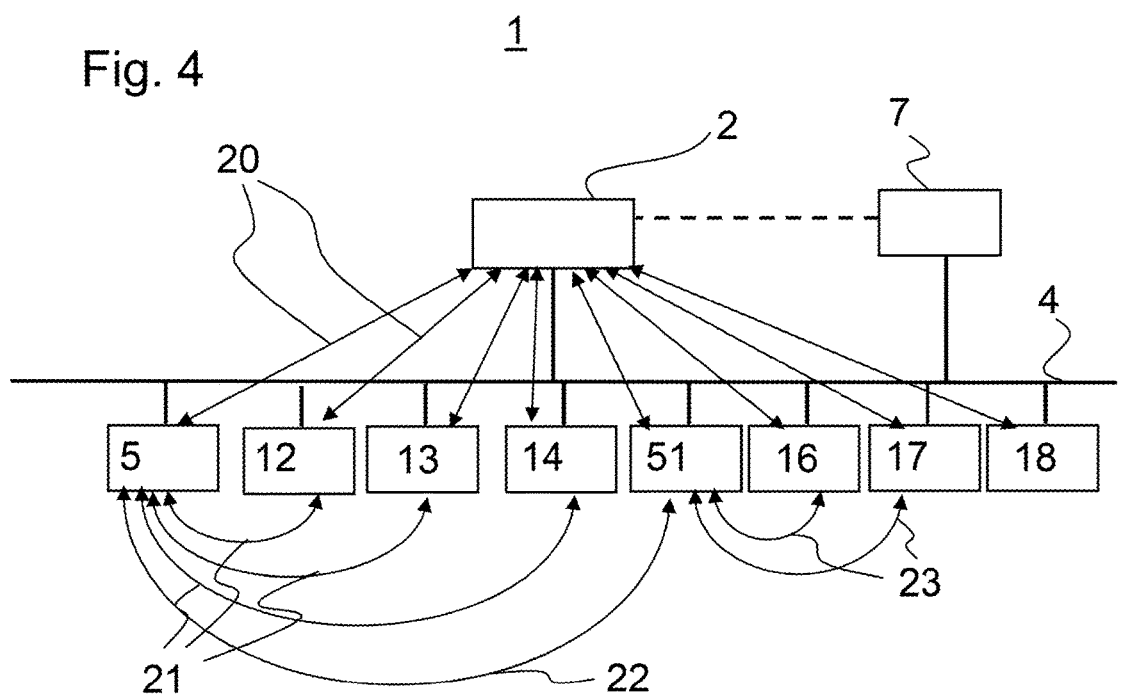
FIG. 4 shows of variant of the schematic circuit diagram with a plurality of logic modules.

The schematic circuit diagram of FIG. 4 shows an exemplary embodiment of this. As well as the logic module 5, a further logic module 51 is connected to the communications network 4. Together with the network subscribers 16, 17, which are designed here as safe, the further logic module 51 is to control a further safety-related application. Accordingly, together with the further logic module 51, the I/O network subscribers 16, 17, like the I/O network subscribers 12, 13, 14 together with the first logic module 5, in each case form a logical group of modules for executing a safety-related function. The further logic module 51 communicates with the first logic module 5 via a logical connection 22. The transmission of the start command from the first logic module 5, the one or more read requests by the further logic module 51, and the transmission of the parameterization data from the first logic module 5 to the further logic module 51 take place via this logical connection. In a further step, as described above, the respectively associated I/O network subscribers 12, 13, 14 and 16, 17 can then be parameterized in a corresponding manner via the logical connections 21, 23.

In general, and as described above, the invention offers the following expansion possibilities and advantages:

The processing of the protocol does not have to be carried out synchronously with the transmission cycle via the network. If, therefore, the protocol could not be processed in a timely manner by the next transmission cycle, then the old protocol data can be retransmitted.

The control of the sequence of reading out the parameter data can be carried out by a safe subscriber as necessary according to the stipulations of safety technology. The copy routines, which are already provided for the safe messages, must only be marginally expanded, if at all, for the transmission of parameter data from the safe logic module to safe I/O network subscribers, such as for example the network subscribers 12, 13, 14, 16, 17 according to FIG. 4 and subordinate logic modules. The copy routines, with which the data transmitted from and to the I/O network subscribers are copied by the communication master 2, are shown symbolically in FIG. 2 and designated by the reference 52.

The receiver of the parameter data determines the timing of the transmission. As a result, for example, no time-controlled interrogations by the transmitter are necessary as to whether the receiver has already started or whether the connection between transmitter and receiver already exists. Sub-systems automatically run up with the available I/O subscribers. I/O network subscribers which have been docked later can automatically be incorporated into the system.

The person skilled in the art can see that the invention is not restricted to the exemplary embodiments shown in the figures. Rather, the invention can be varied in many ways within the scope of the subject matter of the following claims. In the example shown in FIG. 3, two bytes of parameterization data are requested in each case. However, this length can be adapted to suit the data width available in a telegram. Also, the number of bytes can be varied from telegram to telegram during the transmission of a data module, for example by an appropriate read request. The exemplary embodiment of FIG. 3 therefore already provides that the read requirement contains the number of bytes requested.

LIST OF REFERENCES

1 Control device
2 Communication master
4 Communications network
5, 51 Safe logic module
7 Computer
12-18 Network subscriber
20 Point-to-point connection
21, 22, 23 Logical connection
31-38 Method steps for parameterizing the logic module 5
40, 41 Parameter channel
43 Data range for safe messages
44 Safe telegram
45 Read request
47 Parameter set
48 Segment
49 Number of bytes read out
50 Offset 50
51 ParameterReadResponse message
52 Copy routine

What is claimed is:

1. A control device (1) with a communications network (4) for controlling safety-critical processes in an automated plant, wherein the communications network (4)
   has an, in particular, non-safe communication master (2) for controlling the data flow on the communications network (4) and
   a plurality of network subscribers (12, 13, 14, 15, 16, 17, 18), wherein
   at least one subset of the network subscribers (12, 13, 14, 15, 16, 17, 18) are designed as safe network subscribers (12, 13, 14), and
   at least one safe logic module (5) as further network subscriber for controlling a safety-relevant application by means of a group of safety-related network subscribers (12, 13, 14), wherein the logic module (5) and the communication master (2) are set up for carrying out the following steps in order to parameterize the logic module (5):
   in response to the receipt of a start command transmitted via the communications network (4), the logic module (5) transmits a read request (45) to the communication master (2) via the communications network (4),
   in response to the receipt of the read request (45), the communication master (2) transmits parameterization data to the logic module (5)
   wherein:
   the communication master (2) is set up to generate the start command which signals that new parameters and a complete project are to be retentively stored in the logic module (5), wherein:
   a parameter identifier of an old, previously retentively stored, parameter set is stored in the communication master (2),
   the logic module (5) is set up
   to first read out the parameter identifier from the communication master (2) and
   to undertake a safe comparison with the retentively stored parameters,
   in the event that the data are consistent, to erase the retentively memory of the logic module (5) and
   otherwise to transmit a first error message,
   in the event of consistent data, to read out the new parameters from the communication master (2) by means of the read request (45),
   to recheck the new parameterization data read out for consistency and
   if the parameterization data are detected by the logic module (5) to be free from errors, to retentively store them, and
   otherwise to transmit a second error message.

2. The control device (1) as claimed in claim 1, wherein the logic module (5) is set up to send the read request (45)

successively in telegrams (44) via the communications network (4) at least until it receives a first telegram (44) with parameter data from the communication master (2).

3. The control device as claimed in claim 2, wherein the logic module (5) is set up to detect how much parameterization data is to be requested and to transmit the read request (45) to the communication master (2) until all the parameterization data have been received.

4. The control device (1) as claimed in claim 1, wherein the communication master (2) is set up to transmit the start command to the logic module (5) via the communications network (4) to start the parameterization process.

5. The control device as claimed in claim 4, wherein the communication master (2) is set up to transmit the parameterization data in a logical channel (40) provided for the purpose which is represented by a predetermined data range of the telegrams (44) transmitted via the communications network (4).

6. The control device as claimed in claim 1, wherein the communication master (2) is set up to divide up the parameterization data and to transmit them successively in a plurality of telegrams.

7. The control device as claimed in claim 1 wherein, triggered by a system power-on or an initialization of the logic module (5) and/or in response to the start command received from the communication master (2), the logic module (5) is set up to transmit a telegram to the communication master (2) with a state of the logic module (5) as a diagnostic message.

8. The control device as claimed in claim 1, wherein the logic module (5) is set up to transmit with, the read request (45), a requested part of the parameterization data, and wherein the communication master (2) is set up to transmit the requested part of the parameterization data based on the request.

9. The control device as claimed in claim 1, wherein the communication master (2) is set up to generate the start command which signals that the parameter identifier is present, wherein the logic module (5) is set up to read out the parameter identifier from the communication master (2) and to safely compare the parameter identifier with parameters retentively stored in the logic module.

10. The control device as claimed in claim 1, wherein, in response to the receipt of the start command transmitted by the logic module (5) via the communications network (4), at least one of the safe network subscribers (12, 13, 14) which are associated with the logic module (5) for the control of a safety-related application is set up to transmit the read request (45) to the logic module (5) via the communications network (4), and wherein, in response to the receipt of the read request (45), the logic module (5) is set up to transmit the parameterization data to the corresponding safe network subscriber (12, 13, 14) from which the read request (45) was received.

11. The control device as claimed in claim 1, wherein as well as a first logic module (5),
at least one further logic module (51) is connected to the communications network (4), wherein
the first logic module (5) is parameterized by a start command of the communication master (2), at least one read request (45) of the first logic module (5), and a transmission of the parameterization data from the communication master (2) to the first logic module (5), and wherein in addition, the communication master (2) also transmits the parameterization data for the further logic module (51) to the first logic module (5), and wherein
the further logic module (51) is parameterized in that, after receipt of the parameterization data, the logic module (5) transmits a start command to the further logic module (51), in response to the receipt of the start command the further logic module (51) transmits a read request (45) to the first logic module (5), and in response to the receipt of the read request (45) the first logic module (5) transmits the parameterization data to the further logic module (51).

12. A parameterization method for a control device (1) with a communications network (4) for controlling safety-critical processes in an automated plant, wherein the communications network (4)
has an, in particular, non-safe communication master (2) for controlling the data flow on the communications network (4) and
a plurality of network subscribers (12, 13, 14, 15, 16, 17, 18), wherein
at least one subset of the network subscribers (12, 13, 14, 15, 16, 17, 18) are designed as safe network subscribers (12, 13, 14), and
at least one safe logic module (5) as further network subscriber for controlling a safety-relevant application by means of a group of safety-related network subscribers (12, 13, 14), wherein the logic module (5) and the communication master (2) carry out the following steps in order to parameterize the logic module (5):
in response to the receipt of a start command transmitted via the communications network (4), the logic module (5) transmits a read request (45) to the communication master (2) via the communications network (4),
in response to the receipt of the read request, the communication master (2) transmits parameterization data to the logic module (5)
wherein:
the communication master (2) is set up to generate the start command which signals that new parameters and a complete project are to be retentively stored in the logic module (5), wherein:
a parameter identifier of an old, previously retentively stored, parameter set is stored in the communication master (2),
the logic module (5) is set up
to first read out the parameter identifier from the communication master (2) and
to undertake a safe comparison with the retentively stored parameters,
in the event that the data are consistent, to erase the retentively memory of the logic module (5) and otherwise to transmit a first error message,
in the event of consistent data, to read out the new parameters from the communication master (2) by means of the read request (45),
to recheck the new parameterization data read out for consistency and
if the parameterization data are detected by the logic module (5) to be free from errors, to retentively store them, and
otherwise to transmit a second error message.

* * * * *